United States Patent [19]

Krinock

[11] Patent Number: 4,663,769
[45] Date of Patent: May 5, 1987

[54] CLOCK ACQUISITION INDICATOR CIRCUIT FOR NRZ DATA

[75] Inventor: Jerome V. Krinock, Owensobor, Ky.

[73] Assignee: Motorola, Inc., Schaumburg, Ill.

[21] Appl. No.: 783,077

[22] Filed: Oct. 2, 1985

[51] Int. Cl.$^4$ .............................................. H04L 7/02
[52] U.S. Cl. ..................................... 375/110; 307/527
[58] Field of Search .................... 375/110, 87, 82, 94, 375/120, 118; 307/527, 528; 360/51

[56] References Cited

U.S. PATENT DOCUMENTS

| | | | |
|---|---|---|---|
| 4,222,009 | 9/1980 | Moulton et al. ..................... | 375/110 |
| 4,400,667 | 8/1983 | Belkin ................................. | 375/120 |
| 4,422,176 | 12/1983 | Summers ............................. | 307/527 |

Primary Examiner—Robert L. Griffin
Assistant Examiner—M. Huseman

[57] ABSTRACT

A clock acquisition indicator circuit for NRZ "data", "which requires" two clock signals advanced and retarded by 90-degrees from the recovered clock. The circuit partitions each cycle of recovered clock into a half-cycle in which transitions should occur and a half-cycle in which transitions should not occur. The transitions ideally occur at only one instant in each cycle (when the clock goes positive), but the widening of the window to an entire half-cycle centered on this instant allows for phase noise on the NRZ data transitions and phase jitter in the recovered clock. The remaining half-cycle (which is centered on the instant when the clock goes negative) is a window during which transitions should not occur. The density of transitions in each of these windows is output as analog voltages which may be processed to determine the prevailing state from among three possible conditions.

2 Claims, 7 Drawing Figures

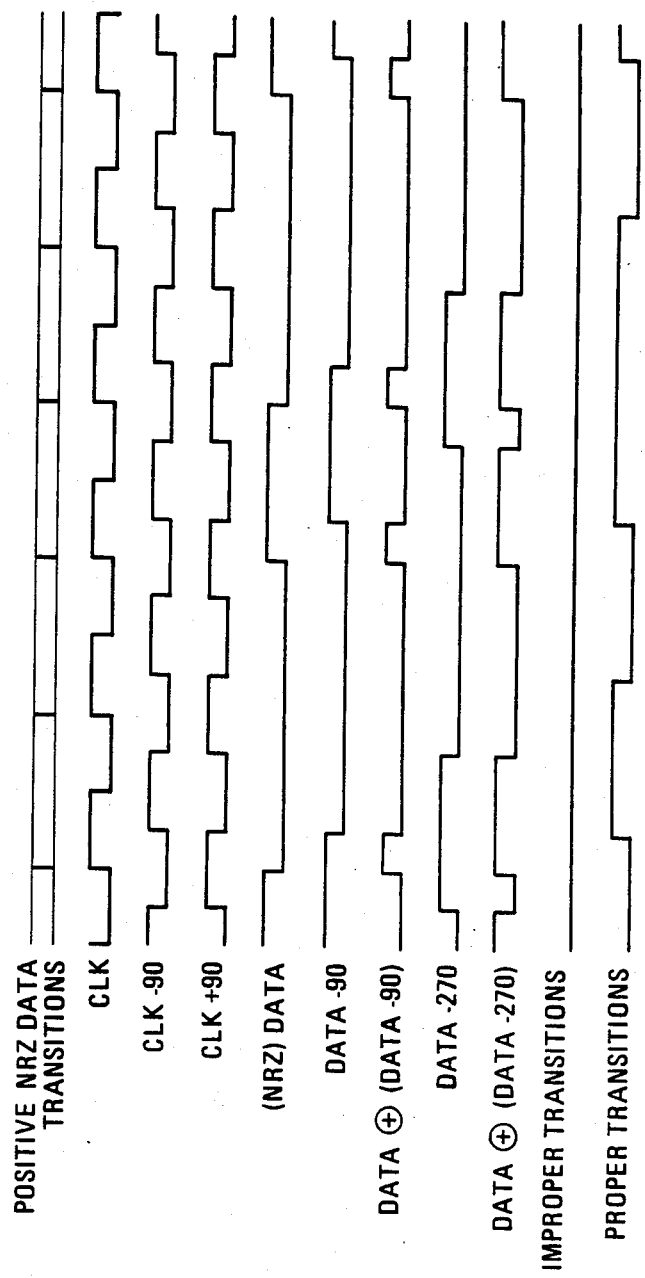

CLOCK ACQUISITION INDICATOR CIRCUIT FOR NRZ DATA

BACKGROUND

1. Field of the Invention

The invention relates to the recovery of a clock signal from transmitted data when all that is available is a bit stream of random nonreturn-to-zero (NRZ) data. In particular, the invention relates to a circuit which works in conjunction with the clock recovery circuit to provide a logical output corresponding to whether or not the clock recovery circuit has been successful.

2. Description of the Prior Art

An NRZ data stream, to which the invention has application, is a two-state signal which assumes either a "positive" or "negative" state corresponding to a binary "1" or a "0". In other words, each state continues for the full duration of the clocking interval, and no change occurs between successive like states at the boundary between clocking intervals. The clock signal is a square wave of frequency equal to the bit rate of the NRZ data input, phased so that the positive transitions of this wave occur simultaneously with the time of possible transition in the NRZ data. When data is stored or transmitted over a communication link, it is generally not efficient to also store or transmit the clock signal which is required by the receiving circuitry to strobe the data signal in order to evaluate it and to enumerate the incoming bits for subsequent processing. A clock recovery circuit is employed to obtain this information from the NRZ data stream available from the storage or transmission medium.

Clock recovery circuits are increasingly being implemented as phaselock loops due to the elimination of tank circuits using ferrite-core inductors that vary unpredictably with temperature. These circuits often feature either frequency-sweep or wide-bandwidth aided acquisition. In either case, a binary signal indicating successful clock acquisition is needed to turn off the acquisition-aid circuit. Indication of clock acquisition is often crucial in systems requiring joint acquisition of clock and carrier such as coherent receivers for continuous-phase frequency-shift keyed (CPFSK) signals. Also, indication of clock acquisition is a useful indicator of signal reception at a certain location in a complex communication system. Indications like this from various points can be used to isolate problems in circuits or transmission media. In this latter case especially, the condition of "no signal input" must be detected as "no clock acquisition" by the indicator circuit.

Some prior designs have either omitted the clock acquisition indicator circuit or have interpreted a stable state of the phase lock loop VCO control voltage as an indication of clock recovery, which is not a reliable indication. In some cases, this has been slightly improved by also requiring that the envelope of an input signal be present. Equipments are known which have a reliable lock indicator for clock acquisition from the bipolar, 50% duty-cycle data signal commonly transmitted over twisted pairs in telecommunication systems, but reliable clock acquisition indicators for a clock recovery circuit operating on NRZ data are not readily available.

SUMMARY OF THE INVENTION

Accordingly, it is an object of the present invention to provide a novel circuit for indicating whether or not clock recovery of nonreturn-to-zero (NRZ) data has been successful.

It is a further object of this invention to provide a circuit which will indicate one of three conditions in respect to NRZ data via two analog outputs:

No NRZ data input is present, NRZ data input is present but recovered clock phase and/or frequency not properly synchronized with it, or NRZ data input is present and the clock acquisition has been successful.

It is a further object of this invention to provide in combination with means for achieving clock recovery, and for indicating such recovery, a simple analog decision circuit for processing these two outputs into a binary "clock acquired-yes or no" output.

These and other objects of the invention are achieved in a novel combination operating an NRZ data including a clock acquisition indicator circuit and a clock recovery circuit.

The clock acquisition indicator circuit requires three inputs, which include the NRZ data input, and two inputs from the clock recovery circuit, namely, clock signals advanced and retarded in phase by 90 degrees from the recovered clock. If these are not available in the clock recovery circuit, they may be easily derived as explained in our description and figures.

The circuit operates by partitioning each cycle of recovered clock into a half-cycle in which transitions should occur and a half-cycle in which transitions should not occur. Ideally, transitions occur at only one instant in each cycle (when the clock goes positive), but the widening of the window to an entire half-cycle centered on this instant allows for phase noise on the NRZ data transitions and phase jitter in the recovered clock. The remaining half-cycle (which is centered on the instant when the clock goes negative) is a window when transitions should not occur. The density of transitions in each of these windows is output as analog voltages which may be processed to determine the prevailing state from among the three conditions given above.

BRIEF DESCRIPTION OF THE DRAWINGS

The novel and distinctive features of the invention are set forth in the claims of the present application. The invention itself, however, together with further objects and advantages thereof, may best be understood by reference to the following description and accompanying drawings in which:

FIG. 3A deals with the clock recovery circuit per se while FIG. 3B shows the waveforms present during operation of this circuit.

FIG. 5 are waveforms illustrating the operation of the clock acquisition indicator circuit in a typical sequence in which clocking is acquired for random NRZ data.

DESCRIPTION OF THE PREFERRED EMBODIMENT

Figure 1:
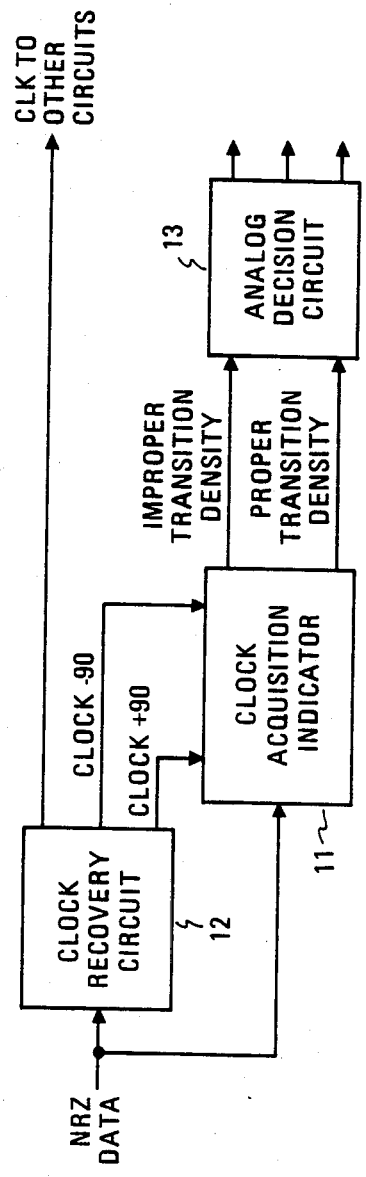
FIG. 1 is a simplified block diagram of the combination of a clock recovery circuit, a clock acquisition indicator circuit and an analog decision circuit as elements of a system for recovering clock from NRZ data.

FIG. 1 is a simplified block diagram of the clock acquisition indicator circuit operating with an analog decision circuit as part of a system for recovering the clock from NRZ data. The NRZ data input is coupled to the clock recovery circuit 12 which acquires the clock from the NRZ data. This circuit is typically either a rectifier, tuned circuit and shaper or a phaselock loop. However, it must generate a square-wave output of frequency within thirty percent or so of the input NRZ data rate even under conditions of no signal input for proper operation of the clock acquisition indicator circuit. This is more easily assured with the phaselock loop than with the rectifier, tuned circuit and shaper. The phaselock loop has been the preferred choice by practitioners of the art in recent years for other reasons also, especially the unpredictability of ferrite temperature coefficients and the resulting difficulty in designing tuned circuits which are stable enough over temperature.

After proper recovery, the clock (CLK) signal should be a square wave of frequency equal to the bit rate of the NRZ data input, phased so that the positive transitions of this wave occur simultaneously with the beginning of the eye of the NRZ data. The eye of NRZ data is defined as the time interval beginning at an instant of possible data transition and continuing for one bit time.

Figure 2:
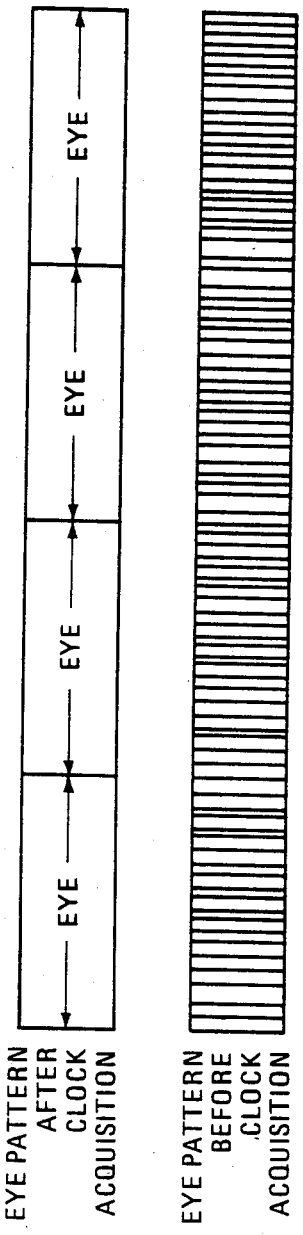
FIG. 2 is an illustration depicting Eye Patterns before and after clock recovery.

The eye patterns before and after clock recovery are illustrated in FIG. 2. The "not in lock" pattern is characterized by a significant number of transitions at intermediate positions not coincident with the instants of "possible" data transitions. The properly recovered clock signal is coupled to other circuits not shown here, typically the data latch used to regenerate a clean bit stream from the incoming NRZ data and also to the clock input of subsequent decoding or other bit-processing circuitry. The clock recovery circuit 12 must also generate clocks leading and lagging this recovered clock by 90-degrees, and couple them to the clock acquisition indicator 11. These clocks may be generated from the recovered clock within the clock recovery circuit 12 by the means set forth in FIG. 3A or by other well-known means.

Block 11 of FIG. 1 is the clock acquisition indicator circuit. The NRZ data supplied to the system and the clocks leading and lagging the recovered clock are coupled to this circuit. Recalling that the 90-degree leading and lagging clocks are generated directly from the recovered clock, it can be seen that the clock acquisition indicator has the NRZ data input and the clock recovered from it by the clock recovery circuit at its disposal. The circuit compares this clock with the input NRZ data and determines whether or not it has indeed been properly recovered from it.

The two outputs of the clock acquisition indicator 11 are labeled proper-and improper-transition density. These are analog dc voltages whose normalized value may be measured to determine the state of clock recovery by using the following table:

| STATE OF CLOCK RECOVERY | NORMALIZED OUTPUT VOLTAGES | |
|---|---|---|
| | Proper-Transition Density | Improper-Transition Density |
| 1. No NRZ data input | 0.0 | 0.0 |
| 2. NRZ data input but recovered clock phase and/or frequency not properly synchronized with it | 0.25 | 0.25 |
| 3. NRZ data input present and proper clock recovery by clock recovery circuit | 0.5 | 0.0 |

The voltages in the table above have been normalized such that the high-state output of the flipflops from which these outputs are coupled (25 and 26 of FIG. 4) is 1.0.

These outputs are coupled to the analog decision circuit 13. This circuit measures the proper- and improper-transition densities coupled from the clock acquisition circuit and furnishes logical outputs using the rules set forth in the table above.

Figure 3A:
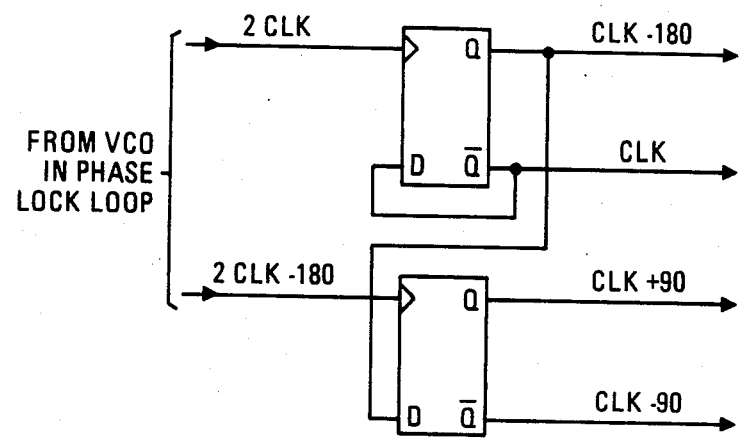
FIGS. 3A and 3B describe a typical, known clock recovery circuit for generating clocks which lead and lag the recovered clock in phase by 90 degrees.

FIG. 3A shows a typical arrangement within the clock recovery circuit for generating the clocks leading and lagging the recovered clock in phase by 90-degrees. These clocks are required by the clock acquisition circuit. This clock receiver circuit is preferred due to its freedom from analog elements and its insensitivity to clock rate. It requires the supply of a square wave of exactly twice the recovered clock frequency (2 CLK) and its 180 degree complement (2 CLK $-180$). The preferred arrangement is for the voltage-controlled oscillator (VCO) in the phaselock loop clock recovery circuit to operate at twice the input NRZ data rate. This twice-clock signal drives the circuit of FIG. 3A which provides four clocks in a definite (i.e. unambiguous) quadrature phase relationship. The recovered clock (CLK), the ninety-degree-leading clock (CLK$+90$) and the ninety-degree lagging clock (CLK$-90$) are then available from this circuit. It is comprised of two type-D flipflops connected as shown.

Figure 3B:
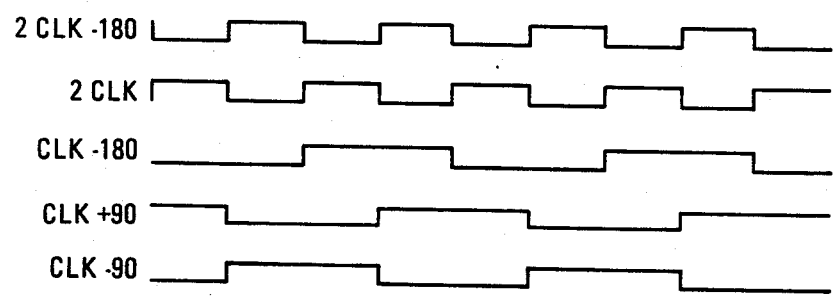

The FIG. 3B shows the waveforms present during operation of this circuit. It may be understood by recalling that the Q output of a type-D flipflop is latched to the level present at its D input whenever a low-to-high transition is seen in the signal coupled to its clock ($>$) input. The not-Q output is always the logical complement of the Q output.

Figure 4:
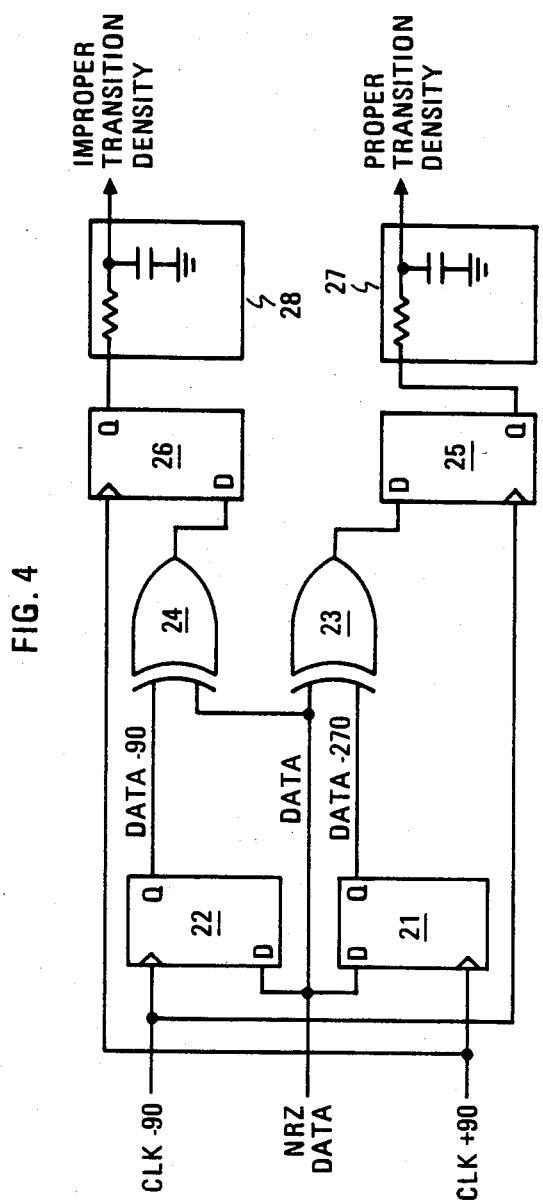
FIG. 4 is a schematic diagram of the clock acquisition indicator circuit per se, one of the blocks of FIG. 1. The illustration is of the preferred embodiment of this circuit.

FIG. 4 is a schematic diagram of the clock acquisition indicator circuit in accordance with the preferred embodiment. The input signals to the circuit are the 90-degree advanced and retarded clocks from the clock recovery circuit and the NRZ data input. The notation "CLK$+90$" refers to the clock which is advanced in phase by 90 degrees from the recovered clock and the notation "CLK$-90$" refers to the clock which is retarded in phase by 90 degrees from the recovered clock. FIG. 5 are waveforms illustrating the operation of the clock acquisition indicator circuit during a typical sequence of random NRZ data (the fifth waveform from the top in FIG. 5). The waveforms shown assume that the clock recovery circuit has acquired the clock. FIG. 5 may be used to understand the operation of the circuit of FIG. 4.

The clock acquisition indicator circuit accepts the NRZ data and two clocks as inputs and produces two analog outputs corresponding to "proper" and "improper" transition densities as noted earlier. As illustrated, the NRZ data is coupled to the D inputs of the flipflops 21 and 22 and to a first input of the exclusive-OR gates 23 and 24. The (CLK+90) clock, which goes high ¾ of the way through the "eye" is coupled to the clocking input of the flipflops 21 and 26 while the (CLK−90) input, which goes high ¼ of the way through the "eye" is coupled to the clocking input of the flipflops 22 and 25. The Q output of the flipflop containing data-270 is coupled to the second output of exclusive-OR gate 23 and the Q output of the flipflop 22 containing data-90 is coupled to the OR gate 24. The output of the exclusive-OR gate 23 containing [data XOR (data-270)] is coupled to the D input of flipflop 25 and the output of exclusive-OR gate 24 containing [data XOR (data-90)] is coupled to the D input of flipflop 26. The Q output of flipflop 25 is then coupled to the filter 27, at the output of which the analog quantity corresponding to the "proper" transition density appears. The Q output of the flipflop 26 is coupled to the filter 28 at the output of which the analog quantity corresponding to the "improper" density appears.

The operation of the clock acquisition circuit may now be explained in further detail with reference to the waveforms of FIG. 5. The NRZ data input is coupled to the D inputs of flipflops 21 and 22, which are clocked by CLK−90 and CLK+90, respectively. These clocks and NRZ data are represented respectively by the third, fourth and fifth waveforms (from the top) in FIG. 5. The Q outputs of these flipflops are thus replications of the NRZ data input delayed by 270 and 90 degrees of the clock, respectively as illustrated in the eighth and sixth waveform, respectively.

Exclusive-OR gates 23 and 24 are the logical blocks which actually determine whether or not the pertinent transitions have occured in the data with each clock cycle. Exclusive-OR gates 23 and 24 produce a positive output when their two inputs are different and a negative output when their two inputs are the same. One input of each of them is coupled from the (undelayed) NRZ data. The other input of gate 23 is coupled from the data delayed by 270 degrees from flipflop 21 and the other input of gate 24 is coupled from the data delayed by 90 degrees from flipflop 22. Thus the gates 23 and 24 compare the present data with the data 270 degrees and 90 degrees earlier, generating a positive output if a transition has occured.

As may be seen from the ninth line of FIG. 5, a proper transition of the data results in a positive output from gate 23 at the next positive transition of CLK−90. Likewise, the seventh line of FIG. 5 shows how an improper transition of the data results in a positive output from gate 24 at the next positive transition of CLK+90. To recover this information, the circuit must latch the output of gate 23 at each positive transition of CLK−90 and must latch the output of gate 24 at each positive transition of CLK+90. These functions are performed by flipflops 25 and 26, respectively. Thus, the Q output of flipflop 25 is a binary signal with transitions at the data rate whose duty cycle (ratio of the periods for which the output is positive to those for which the output is negative) is proportional to the fraction of clock periods during which a proper transition occurs. This is shown in the eleventh (last) line of FIG. 5. Likewise, the Q output of flipflop 26 is a similar binary signal whose duty cycle is proportional to the fraction of clock periods during which an improper transition occurs. This is shown in the tenth line of FIG. 5. Note that it is always in the negative state. This is because the clock and data inputs assumed in the derivation of FIG. 5 were taken for the case following clock acquisition by the clock recovery circuit. In this case there are no improper transitions. If there were an NRZ data input, but the clock had not yet been acquired, then there would be transitions occuring during half of the clock periods. Half of these transitions (during one fourth of the clock periods) would be "improper". Thus, the output of flipflop 26 would be in the positive state one fourth of the time. Similarly the output of flipflop 25 would also be in the positive state one fourth of the time.

The binary signals from flipflops 25 and 26 are filtered by RC networks 27 and 28, respectively, resulting in analog voltages which are proportional to the density of proper transitions and of improper transitions, respectively. In the preferred embodiment, the series resistors are 4990 ohms and the shunt capacitors are 0.1 microfarad. The capacitor voltages are the outputs of the clock acquisition indicator circuit, which have been previously termed proper transition density and improper transition density, respectively.

Figure 6:
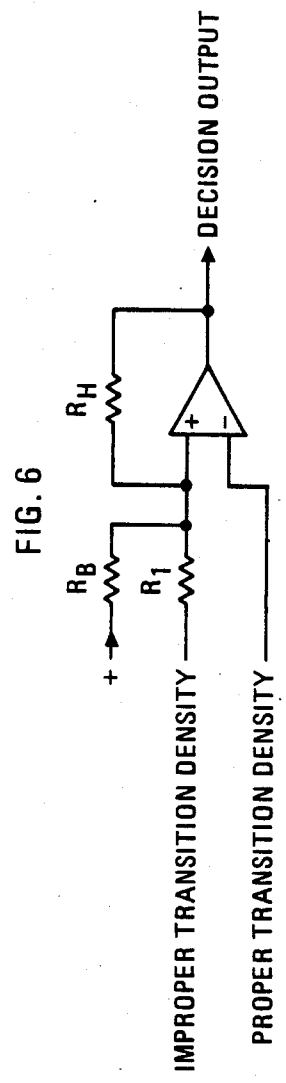
FIG. 6 is a schematic diagram of the analog decision circuit, also one of blocks of FIG. 1. The illustration is of the preferred embodiment of this circuit.

FIG. 6 is a schematic diagram of the analog decision circuit, which is the preferred output responsive means. The analog signals, improper transition density and proper transition density are coupled to the positive and negative inputs of a voltage comparator, respectively. The improper transition density is coupled to the positive input through resistor R1, in order that resistors RB and RH may also affect the circuit. Resistor RB provides the bias necessary to distinguish the case after clock recovery, when the proper transition density exceeds the improper transition density, from the cases of no clock acquisition, when the two densities are equal as indicated in the previous table. Resistor RH provides hysteresis to the decision at the output of the comparator. Clock acquisition produces a negative output while the cases of no clock acquisition produces a positive output.

The cost significance of wrong decisions, the rms phase deviations of the data transitions due to communication-link noise and the rms jitter on the recovered clock seen in specific applications will affect the desired thresholds slightly. However the variations are expected to be small and the ratios among R1, RB and RH which result from these considerations are expected to be about the same in most applications. In the preferred embodiment which gives good performance, the gates 25 and 26 are 74F74 devices powered from +5 V and loaded by 470-ohm resistors, the series arms of the filters are 4990 ohms, the comparator is an opamp powered from +15 V and −15 V, the value of R1 is 4990 ohms, RB is 270K ohms and of RH is 1.5M ohms.

What is claimed is:

1. In a system for providing the recovered clock in nonreturn-to-zero (NRZ) data, said NRZ data occurring at a given bit rate, having a known range of average transition densities, an eye of said NRZ data being the time interval beginning at an instant of possible data transition and continuing for one bit time, the combination comprising:

A. a clock recovery circuit providing clocks at 90-degrees leading and lagging phases of the recovered clock, the recovered clock being a square wave of frequency equal to the NRZ data phased so that its positive transitions occur simultaneously with the beginning of said eye, and B. a clock acquisition indicator circuit comprising
  (1) a first positive-edge-triggered type D flipflop having said NRZ data coupled to its D input, having said clock at 90-degrees leading phase coupled to its clock input and providing a Q output indicating the state of the NRZ data three-quarters of the way through the eye thereof,
  (2) a second positive-edge-triggered type D flipflop having said NRZ data coupled to its D input, having said clock at 90-degrees lagging phase coupled to its clock input and providing a Q output indicating the state of the NRZ data one-quarter of the way through the eye thereof,
  (3) a first exclusive-OR gate having said NRZ data coupled to one input terminal thereof, having the Q output of said first flipflop coupled to the other input, and producing an output,
  (4) a second exclusive-OR gate having said NRZ data coupled to one input thereof, having the Q output of said second flipflop coupled to the other input, and producing on output,
  (5) a third positive-edge-triggered type D flipflop having the output of said first exclusive-OR gate coupled to its D input, having said clock at 90-degrees lagging phase coupled to its clock input, and producing a Q output indicating that transitions have occurred between three-quarters of the way through one eye and one-quarter of the way through the succeeding eye, said transitions being expected when the recovered clock has been acquired,
  (6) a fourth positive-edge-triggered type D flipflop having the output of said second exclusive-OR gate coupled to its D input, having said clock at 90-degrees leading phase coupled to its clock input, and producing a Q output indicating that transitions have occurred between one-quarter of the way and three-quarters of the way through said eye, said transitions being expected when the recovered clock has not been acquired,
  (7) a first low-pass filter of time constant longer that the longest expected period of no transitions in said NRZ data coupled to the Q output of said third flipflop for producing an output voltage proportional to the density of transitions expected when the recovered clock has been acquired,
  (8) a second low-pass filter of time constant longer than the longest expected period of no transitions in said NRZ data coupled to the Q output of said fourth flipflop for producing an output voltage proportional to the density of transitions expected when the recovered clock has not been acquired; and C. means responsive to the output of at least one of said low-pass filters to indicate an improper or proper recovered clock condition.

2. The combination set forth in claim 1 wherein said output responsive means comprises
  A. a voltage comparator having an output and a differential input comprising a positive and negative input,
    its negative input coupled to the output of said first low pass filter at which the output proportional to the proper transition density appears; and
    its positive input coupled to the output of said second low pass filter at which the output proportional to the improper density appears;
  B. means coupled between said comparator output and input to effect hysteresis; and
  C. means to bias the differential input to favor the improper density input,
whereby the comparator output is a logical signal indicating whether the recovered clock has been acquired from the NRZ data, that the transition density of the NRZ data is below the expected lower limit or that the acquisition of the recovered clock has failed.

* * * * *